(12) United States Patent
Lafdi et al.

(10) Patent No.: US 8,895,105 B2
(45) Date of Patent: Nov. 25, 2014

(54) RECEPTOR-CATALYST GROWTH PROCESS FOR CARBON NANOTUBES

(75) Inventors: Khalid Lafdi, Dayton, OH (US);
Lingchuan Li, Dayton, OH (US);
Matthew C. Boehle, New Vienna, OH (US); Alexandre Lagounov, Dayton, OH (US)

(73) Assignee: University of Dayton, Dayton, OH (US)

( * ) Notice: Subject to any disclaimer, the term of this patent is extended or adjusted under 35 U.S.C. 154(b) by 23 days.

(21) Appl. No.: 13/494,595

(22) Filed: Jun. 12, 2012

(65) Prior Publication Data

US 2012/0315467 A1 Dec. 13, 2012

Related U.S. Application Data

(60) Provisional application No. 61/496,098, filed on Jun. 13, 2011.

(51) Int. Cl.
| | | |
|---|---|---|
| *C23C 16/26* | (2006.01) | |
| *D01F 9/12* | (2006.01) | |
| *B32B 9/00* | (2006.01) | |
| *C23C 16/44* | (2006.01) | |
| *C01B 31/02* | (2006.01) | |

(52) U.S. Cl.
CPC ........... *C01B 31/0206* (2013.01); *C01B 31/022* (2013.01); *Y10S 977/724* (2013.01); *Y10S 977/778* (2013.01); *Y10S 977/755* (2013.01); *Y10S 977/891* (2013.01)
USPC ........ 427/249.1; 977/724; 977/778; 977/755; 977/891

(58) Field of Classification Search
None
See application file for complete search history.

(56) References Cited

U.S. PATENT DOCUMENTS

| | | | |
|---|---|---|---|
| 4,349,462 | A | 9/1982 | Velenyi et al. |
| 4,595,734 | A | 6/1986 | O'Hearn |
| 5,024,818 | A | 6/1991 | Tibbetts et al. |
| 5,138,028 | A | 8/1992 | Paul et al. |
| 5,165,909 | A | 11/1992 | Tennent et al. |
| 5,374,415 | A | 12/1994 | Alig et al. |
| 5,439,627 | A | 8/1995 | De Jager |
| 5,597,611 | A | 1/1997 | Lennox et al. |
| 5,618,875 | A | 4/1997 | Baker et al. |
| 6,235,674 | B1 | 5/2001 | Tennent et al. |

(Continued)

FOREIGN PATENT DOCUMENTS

| | | |
|---|---|---|
| EP | 0222492 | 5/1987 |
| WO | 01/85612 | 11/2001 |

(Continued)

OTHER PUBLICATIONS

WO 2004/025003, WIPO Machine Generated English Translation (Mar. 25, 2004).

(Continued)

*Primary Examiner* — Joseph Miller, Jr.
(74) *Attorney, Agent, or Firm* — Thompson Hine L.L.P.

(57) ABSTRACT

A method of growing carbon nanomaterials on a substrate wherein the substrate is exposed to an oxidizing gas; a seed material is deposited on the substrate to form a receptor for a catalyst on the surface of said substrate; a catalyst is deposited on the seed material by exposing the receptor on the surface of the substrate to a vapor of the catalyst; and substrate is subjected to chemical vapor deposition in a carbon containing gas to grow carbon nanomaterial on the substrate.

17 Claims, 2 Drawing Sheets

(56) References Cited

U.S. PATENT DOCUMENTS

| | | | |
|---|---|---|---|
| 6,346,189 | B1 | 2/2002 | Dai et al. |
| 6,401,526 | B1 | 6/2002 | Dai et al. |
| 6,495,258 | B1 | 12/2002 | Chen et al. |
| 6,831,017 | B1 * | 12/2004 | Li et al. .................. 438/694 |
| 7,338,684 | B1 | 3/2008 | Curliss et al. |
| 7,927,701 | B2 | 4/2011 | Curliss et al. |
| 2003/0012721 | A1 * | 1/2003 | Nakayama et al. ........ 423/447.3 |
| 2003/0099592 | A1 | 5/2003 | Rodriguez et al. |
| 2005/0029629 | A1 * | 2/2005 | Noguchi et al. ............. 257/627 |
| 2007/0084346 | A1 * | 4/2007 | Boyle et al. .................. 96/101 |
| 2009/0186214 | A1 * | 7/2009 | Lafdi et al. .................. 428/336 |
| 2011/0206846 | A1 * | 8/2011 | Elam et al. ............... 427/255.32 |

FOREIGN PATENT DOCUMENTS

| | | |
|---|---|---|
| WO | 03/097909 | 11/2003 |
| WO | 2004/025003 | 3/2004 |
| WO | 2007/136613 | 11/2007 |

OTHER PUBLICATIONS

PCT, International Search Report, International Application No. PCT/US2012/042001 (Nov. 5, 2012).

Barreiro, A. et al., "Thermal Decomposition of Ferrocene as a Method for Production of Single-Walled Carbon Nanotubes Without Additional Carbon Sources," *J. Phys. Chem.,B*, vol. 110, No. 42, pp. 20973-20977 (2006).

Bronikowski, M.J. et al., "Growth of carbon nanotube bundle arrays on silicon surfaces," *Journal of Vacuum Science and Technology: Part A*, vol. 24, No. 4, pp. 1318-1322 (Jun. 22, 2006).

Conroy, D. et al., "Carbon nanotube reactor: Ferrocene decomposition, iron particle growth, nanotube aggregation and scale-up," *Chemical Engineering Science*, vol. 65, No. 10, pp. 2965-2977 (May 15, 2010).

Konya, Z. et al., "Metal mixtures catalysed carbon nanotube synthesis," AIP Conference Proceedings, American Institute of Physics, New York, USA, vol. 486, pp. 249-253 (Jan. 1, 1999).

Lee, H.C. et al., "Multi-barrier layer-mediated growth of carbon nanotubes," *Thin Solid Films*, vol. 516, No. 11, pp. 3646-3650 (Mar. 13, 2008).

Lin, W. et al., "Synthesis of High-Quality Vertically Aligned Carbon Nanotubes on Bulk Copper Substrate for Thermal Management," *IEEE Transactions on Advanced Packaging*, vol. 33, No. 2, pp. 370-376 (May 1, 2010).

Lysenkov, D. et al., "Nonaligned Carbon Nanotubes Anchored on Porous Alumina: Formation, Process Modeling, Gas-Phase Analysis, and Field-Emission Properties," *Small*, vol. 3, No. 6, pp. 974-985 (Jun. 4, 2007).

Rümmeli, M.H. et al., "Investigating the Outskirts of Fe and Co Catalyst particles in Alumina-Supported Catalytic CVD Carbon Nanotube Growth," *ACS NANO*, vol. 4, No. 2, pp. 1146-1152 (Feb. 23, 2010).

Thostenson, E.T. et al., "Carbon Nanotube/Carbon Fiber Hybrid Multiscale Composites," *Journal of Applied Physics*, vol. 91, No. 9, pp. 6034-6037 (May 1, 2002).

Venegoni, D. et al., "Parametric study for the growth of carbon nanotubes by catalytic chemical vapor deposition in a fluidized bed reactor," *Carbon*, vol. 40, No. 10, pp. 1799-1807 (Aug. 1, 2002).

Zhu, S. et al., "Carbon Nanotube Growth on Carbon Fibers," *Diamond and Related Materials*, 12, pp. 1825-1828 (2003).

* cited by examiner

RECEPTOR-CATALYST GROWTH PROCESS FOR CARBON NANOTUBES

FIELD OF INVENTION

The present invention relates to a method of growing carbon nanomaterials such as carbon nanotubes, carbon nanofibers, and whiskers.

BACKGROUND OF INVENTION

Many techniques are known for growing carbon nanotubes and other carbon nanomaterials on substrates including arc discharge, enhanced plasma vapor deposition (PVD), and chemical vapor deposition (CVD). However, many of the techniques currently in use have a number of limitations. For example, because carbon nanotube growth is a substrate-dependent process, the use of metal catalysts such as Ni, Fe and Co have the potential to diffuse too fast onto the substrate and coalesce into larger particles, leading to the formation of large metal particles, thus reducing catalyst particle density and the potential for carbon nanotube growth. Additionally, once deposited on the surface of a carbon substrate, in the process of depositing the nanomaterials, these catalysts can extract carbon from the substrate and thereby weaken the resulting product.

SUMMARY OF INVENTION

The present invention provides a method of growing carbon nanomaterials such as nanotubes, nanofibers, and whiskers on the surface of various substrates in which the substrate surfaces are activated prior to growth of the carbon nanomaterials to provide controlled growth and density of the carbon nanomaterials grown thereon. The method controls the rate of diffusion of catalytic metals on the substrates and may include the use of nickel, iron and cobalt catalysts or other transition metal catalysts or combination thereof.

One embodiment of the process described herein enables the continuous growth of carbon nanotubes on a substrate. The substrate material may be mechanically conveyed through the hot zone of the reaction chamber, where gas phase carbon sources are introduced. The substrate materials are pre-deposited from solution with nanoscale seed particles that are uses as receptors or traps for the catalyst. Catalytic nanoparticles are introduced in gas phase into the hot zone of the reaction chamber and deposit on the receptor sites.

According to one aspect of the present invention, a method of growing carbon nanomaterials on a substrate is provided which comprises; providing a substrate; exposing at least a portion of the surface of the substrate to an oxidizing gas; depositing a seed material on the surface of the substrate to form receptors for a catalyst; forming catalysts on the surface of the substrate by exposing the substrate to a vapor of the catalyst; and subjecting the surface of the substrate to chemical vapor deposition in the presence of a carbon containing vapor to facilitate the growth of carbon nanomaterials. Carbon nanomaterials include carbon nanotubes, carbon nanofibers and carbon whiskers or combinations thereof. The type of carbon nanomaterial grown is determined by the method parameters, i.e., temperature, gas used in chemical vapor deposition, type of substrate, etc.

The substrate is preferably selected from continuous or discontinuous carbon fibers, fabrics, bundles or mats of graphite, metal, metal alloys, glass, fiberglass, ceramic, or intermetallic compounds. In embodiments where the substrate contains carbon, the carbon substrate may be selected from carbon fibers, carbon nanofibers, carbon films, carbon foam, carbon fabric, and carbon fiber bundles. In still more particular embodiments, the substrate is selected from the group consisting of continuous and discontinuous carbon fibers, glass and ceramic fabrics including woven and non-woven fabrics and mats.

In one embodiment the surface of the substrate is activated using an oxidizing gas. The oxidizing gas is selected from ozone, carbon dioxide, and mixtures thereof. The substrate may be exposed to the oxidizing gas at a temperature of between about 100° C. and 900° C. Where the oxidizing gas comprises ozone, the substrate is exposed at a temperature of between about 100° C. and about 200° C. Where the oxidizing gas comprises carbon dioxide, the substrate is exposed at a temperature of between about 400° C. and about 900° C. The treatment is tailored to prevent degradation of the fiber surface. In embodiment a low temperature surface treatment is used in which the carbon fabric is heated at about 150° C. for 10 min in a flow of air containing ozone that was generated by passing air through an ozone generator. In another embodiment, a high temperature surface treatment is used in which carbon fabric is heated to about 400-550° C. for a period of about 2 to 60 minutes in a forced air flow.

After the surface oxidation/activation, further surface manipulation is desired in order to achieve an optimum surface topography that the catalyst will anchor to. In accordance with this disclosure, seed nanoparticles of metals, metal oxides, and other metal-containing compounds, are applied on the fiber surface to provide receptor sites for the catalyst. Examples of receptor materials include aluminum, molybdenum, and tungsten oxides, nitrates, and sulfates and mixtures thereof. In a particular embodiment the seed material is aluminum oxide. The substrate is treated in a liquid solution of the seed material and may then be air dried at room temperature or dried by heating. As the substrate dries, receptors form on the surface of the substrate, rendering it suitable for capturing the catalyst and growing carbon nanomaterials.

These receptors trap the catalyst on the surface of the substrate. They also prevent or retard carbon in the substrate from being extracted from the substrate and incorporated into the carbon nanomaterials formed under the vapor deposition conditions. Such carbon extraction weakens the integrity of the substrate.

In one embodiment, the fiber surface is immersed in a reactive solution that consists of an aluminum compound or complex dissolved in a solvent (e.g., ethanol, acetone, propanol, benzene, heptane, toluene, xylene, etc. or a mixture thereof). The surface receptor is formed as a result of this reaction. This reaction is slow in nature (e.g., in some cases the reaction time is more than 24 hours). In another embodiment, iron nitrate (0 to 0.1%) may be used to increase the adherence and accelerate the fixation of alumina oxide, however a nitrate based solution is not necessary. It is important to note that neither alumina oxide alone or in combination with iron additives such as iron nitrate act as catalysts in the subsequent carbon deposition process. The receptor solution concentration and treatment are designed such that the receptor is deposited on the surface of the fiber in an amount that yields the desired carbon nanomaterial structure. In particular, the structure and distribution of the nanomaterial on the surface of the fiber will vary with the topography or surface density, spacing, or distribution of the receptors on the fiber. For example, to produce nanotubes a surface topography expressed as surface roughness of 20 nm or less is suitable. To produce nanofibers a surface topography expressed as surface roughness of 120 nm is suitable.

After the seed particles have been deposited and the receptor sites formed on the surface of the substrate, the catalyst is deposited. Catalysts include iron, nickel, cobalt, etc. Similar to the receptor surface coverage, the amount and distribution of the catalyst on the receptor sites will affect the structure and distribution of the nanomaterials. Smaller amounts of catalyst may require longer nanotube growth times than larger amounts of catalyst.

One embodiment of the invention may use an introduction of gas phase catalyst nanoparticles into the reaction chamber. The catalysts provided from the gas phase are from evaporation of an organometallic precursor such as ferrocene, cobaltocene, nickelocene, chromic acetylacetonate, and molybdenyl acetylacetonate, or a combination thereof. The evaporation takes place in a heated, independent container located outside the reaction chamber at a temperature between about 25° C. and 400° C., but preferably between 100° C. to 250° C. The catalyst precursor is introduced into the heated container in the form of a dry powder or dissolved in solvent. In the case of dry powder, it is conveyed continuously into the container by a metered powder feeder and then transformed to gas vapor inside the container. In the case of a dissolved precursor, the powder material is prepared by dissolving in an organic solvent (ethanol, acetone, propanol, benzene, heptane, toluene, xylene, and combinations thereof) and then injecting the liquid into the heated container using a peristaltic pump. In both cases the catalyst is transferred to the reaction chamber in the form of gas vapor. The concentration of catalyst precursor may vary between 0.1% and 20% based on substrate and desired carbon nanomaterial parameters.

Chemical vapor deposition to grow the nanomaterials may be conducted in an otherwise conventional manner. In one embodiment, the vapor deposition is carried out at a temperature between about 600° C. and about 900° C. and utilizes hydrocarbon gases such as acetylene, ethylene or methane, or other carbon containing precursors such as oil, coal, biomass, etc.

In one embodiment of the present invention, the method provides a substrate including carbon nanotubes on the surface thereof, where the carbon nanotubes have a thickness of from about 100 nm to about 30 microns.

The method of the present invention addresses previous problems of nanomaterial dispersion and diffusion during composite processing. By growing carbon nanomaterials on a treated substrate, problems which have previously occurred relating to nanocomposite infiltration during composite fabrication are reduced or eliminated. In addition, the carbon nanomaterials increase the interlaminar shear and thermal conductivity of composites formed from the carbon nanomaterials. Carbon nanomaterials formed by the methods disclosed herein may be used in EMI shielding applications, contact thermal resistance applications, and in ultracapacitors.

Accordingly, it is a feature of the invention to provide a method of growing carbon nanomaterials on a variety of substrates which provides controlled growth and density of the resulting materials. Other features and advantages will be apparent from the following description, the accompanying drawings, and the appended claims.

DETAILED DESCRIPTION

Figure 1:
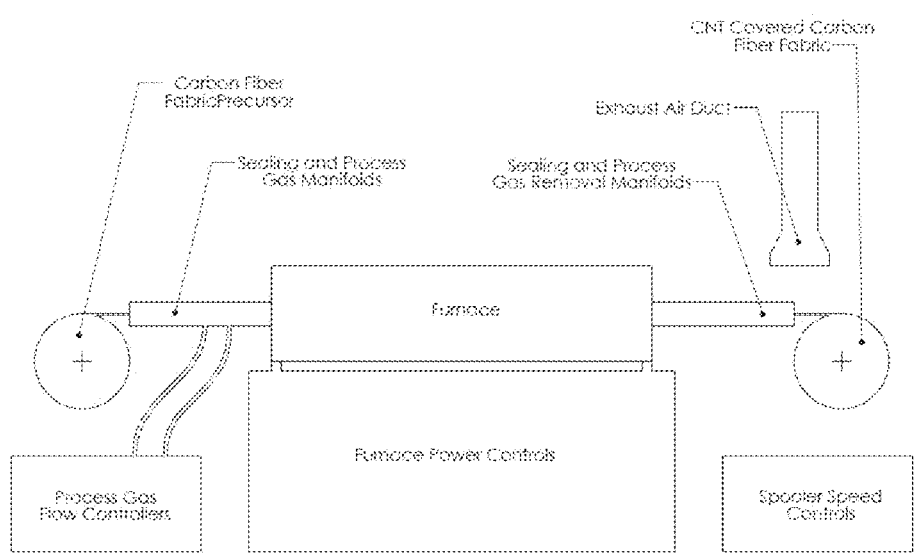
FIG. 1 is a schematic overview of the continuous growth process in accordance with one embodiment in which a fabric precursor enters a reaction chamber at the left and travels through the furnace and the fabric, covered with CNT's, exits the furnace on the right.
Figure 2:
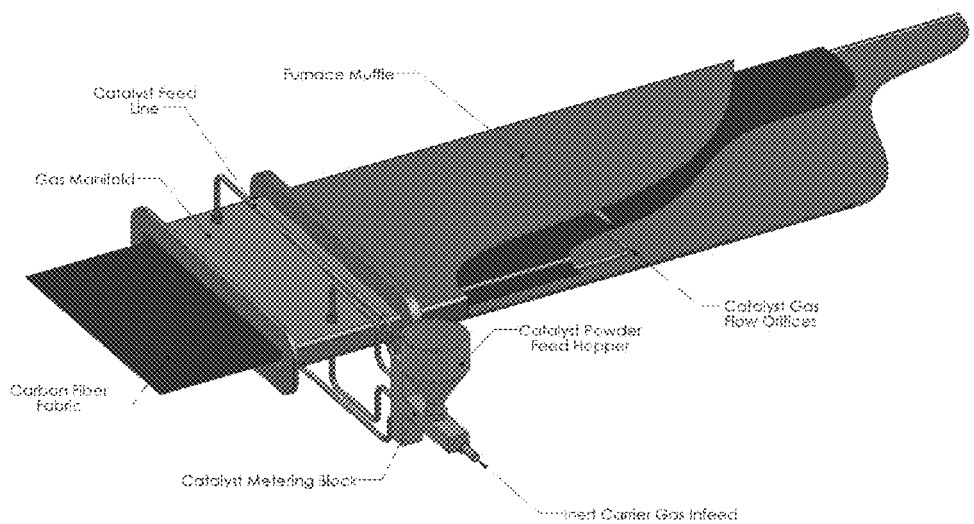
FIG. 2. is a perspective illustration of the gas manifold and muffle system in which a catalyst powder is fed into the furnace, where it evaporates and sprays through small orifices onto the precursor fabric.

The carbon nanomaterials grown in the method of the present invention include carbon nanotubes, carbon nanofibers, and whiskers. The nanotubes formed are typically multi-walled nanotubes, but with the use of certain substrates such as carbon nanofibers and quartz, a combination of multi-walled and single-walled carbon nanotubes may be formed. The type of carbon nanomaterial grown is generally determined by the method parameters such as type of catalyst metal, temperature, gas used in chemical vapor deposition, type of substrate, etc. In one case, the use of a carbon substrate, a nickel catalyst, chemical vapor deposition at about 600° C. under atmospheric pressure, and use of acetylene as the carbon source results in the formation of carbon nanofibers. In another case, iron and iron-molybdenum bi-metal catalysts, chemical vapor deposition at about 780° C., and ethylene as the carbon source, multi-walled carbon nanotubes are formed. Carbon whiskers may be formed when using a carbon or other type of substrate with an iron catalyst and conducting chemical vapor deposition between about 1000° C. and 1100° C. using methane as the carbon source.

Suitable substrates for use in the present invention include, but are not limited to, carbon, graphite, metal, metal alloys, ceramic, glass, fiberglass, and intermetallic compounds. Examples of carbon substrates include fibers (including PAN and mesophase-based carbon fibers), nanofibers, films, foam, fabric, and fiber bundles. Examples of graphite substrates include graphite fibers, foils, plates and rods. Examples of metal substrates include aluminum, chromium, nickel, copper, titanium, and the like. Suitable alloy substrates include stainless steel, aluminum alloys, and titanium alloys. Suitable intermetallic compounds for use as substrates include TiAl, FeAl, $Fe_3Al$, NiAl, $Ni_3Al$, and the like. Where fiberglass materials are used as substrates, it should be appreciated that in addition to conventional fiberglass, glass fiber materials may be used which have catalysts already incorporated on their surface (commercially available from Dow Corning).

In the method of the present invention, the surface of the substrate on which the carbon nanomaterials are grown is prepared by introducing an oxidizing gas into a chamber or container containing the substrate. The oxidizing gas may comprise ozone or carbon dioxide. Fiber sizing, organic residue and contaminants on the substrates are usually detrimental to the carbon nanotube growth, causing inhibition, delay, or even failure of growth. The substrates are subjected to this pretreatment to eliminate these organic substances. The pretreatments include flowing ozone-containing air through the substrates at relatively lower temperature ranging from about 100 to 200° C., or alternatively heating the substrates in flowing air at relatively higher temperature in range of about 300 to 550° C. For each substrate and application, the surface conditioning is tuned accordingly. The pretreatments are preferably carried out continuously by transporting the substrates through a furnace maintained at the required temperature. The pretreatment is also beneficial to applying the catalyst seed particles, by producing surface roughness, improving surface energy and wettability.

After the substrate surface is prepared, a seed material is deposited on the surface of the substrate as explained earlier.

In one embodiment, metal tubing, typically stainless steel, is used to transport the catalyst vapor. It is required that the tubing temperature is maintained between 100 to 400° C., preferably between 150 to 300° C. This may be accomplished by wrapping the tubing with heat tape and inserting thermocouples between the tubing and the heat tape so that the temperature can be accurately controlled with a digital temperature controller. Insufficient temperature could lead to condensation of the catalyst precursor vapor, while overheating could cause decomposition in the tubing prior to having the vapor entering the reaction chamber of the furnace, which would result in improper carbon nanotube growth or failure of growth. The introduction of the catalyst vapors into the reaction zone takes place over a large temperature gradient. In one embodiment the temperature of the catalyst vapor upon its introduction should be preferably not higher than about 300° C. to prevent premature decomposition of the catalyst vapor. The surrounding area should have temperature not smaller than 600° C., preferably between 700 and 800° C. To prevent the tubing delivering the catalyst vapor from overheating, an air cooling tube is bonded to the delivering tubing to provide active cooling.

After the deposition of the catalysts on the receptors on the substrate surface, the substrate is subjected to chemical vapor deposition at a temperature ranging from between about 600.degree. C. and 900.degree. C., and a pressure of 1 atm. The chemical vapor deposition may include the use of various gas phase carbon sources including hydrocarbon gases such as acetylene, ethylene and methane to facilitate the growth of carbon nanomaterials. The growth is controlled by monitoring the reaction time for a time ranging from about 3 to 15 minutes.

In one embodiment it has been found that the catalyst gas temperature gradient is critical to the successful continuous growth of the carbon nanotubes. In accordance with one embodiment, the gas composition and gas gradient are monitored and controlled to provide successful continuous growth of quality carbon nanotubes. Catalytic decomposition of carbon sources at low temperature can be premature, resulting in the deposition of carbon impurity such as amorphous carbon and carbon particles, or defective carbon nanotubes. In addition, due to catalytic decomposition of gaseous carbon sources and conversion into carbon nanotubes, in gas flow direction in the reaction chamber, the gas composition in the reaction chamber unavoidably changes, with a typical drop in carbon source gas concentration and increase in reaction products (namely hydrogen) concentration. The gas composition change may adversely affect the carbon nanotube growth by introducing amorphous carbon as well as reducing catalyst activity, poisoning the catalyst particles, and resulting in low efficiency carbon conversion and therefore growth yield. To eliminate or lessen the above adverse effect, gases are introduced into the reaction chamber in separated independent streams. One of the gas streams is made of mainly inert gas such as nitrogen, which shields the pre-deposited seeds from contact with the carbon source gases and the catalyst vapor until the substrates are transported to the reaction zone, where proper temperature is maintained and catalyst vapor has been delivered. Carbon source gases can be introduced into the reaction zone together with the catalyst vapor or in another separate stream. The carbon sources are typically hydrocarbon gases including acetylene, ethylene, methane, and ethane, etc, and/or evaporated organic solvents including benzene, heptane, toluene, xylene, etc.

The growth of carbon nanotubes may be tailored such that the resulting carbon nanotubes have a thickness of between about 100 nm to 30 microns and a conductivity of between about 6 and 10 W/m.K.

Description of a Growth Furnace

In one embodiment, the growth furnace is a custom box furnace with single zone control. The furnace operates on 208V single phase power and has a maximum temperature of 1000 C although a temperature of 500-900 C is generally used for the growth. The hot zone is 36" long and 16" wide. The furnace has a longitudinal slot through it to allow an alloy muffle to pass through the hot zone. This slot allows a muffle up to 16" wide and 4" tall to be installed in the furnace. The top and bottom of the furnace are hinged to allow opening the furnace to install or remove the alloy muffle.

The furnace sits on a modular aluminum extrusion frame. This frame serves as the base onto which all of the components are mounted. All of the entrance end and exit end components are mounted to this frame. The frame is modular so that it can be quickly changed to accommodate modifications or improvements to the process. The entire frame is on wheels so that it can easily be moved for service or adjustment.

The Inconel® alloy muffle is approximately 48" long, 16" wide and 4" tall. Inconel is necessary to maintain structural integrity in elevated temperatures as well as to resist the carburizing atmosphere within the furnace. The muffle serves as a gas tight barrier to maintain an inert atmosphere and protect the material from oxygen in the air. The muffle extends out each end of the furnace so it may be attached to the gas manifold sections at the entrance and exit of the muffle. Each end of the muffle has a welded flange which allows bolting the gas manifolds to the ends. The joints are sealed with pressed graphite gasket material.

Each joint between the muffle and gas manifolds has a slot plate inserted in it. This plate has a wide slot with a narrow opening to help isolate the different sections of the furnace and to help prevent air from entering the furnace at the exit end. The slot also helps to support the material so it does not droop excessively in the furnace. These slot plates are at a temperature much below the furnace temperature so they may be constructed from stainless steel.

The entrance gas manifold bolts to the entrance end of the muffle. The manifold has top and bottom plates which can be removed for cleaning or servicing the inside of the manifold. Each of these plates has eight gas connection ports to allow routing feedstock gas into the muffle. The plates are attached to the manifold with bolts and are sealed with graphite gaskets.

Both the top and bottom plates have sparger pipes plumbed to them. These pipes consist of a "U" shaped stainless steel tube with an array of small holes drilled into it. The length of the tube is set so that the small holes are located inside the muffle right at the edge of the furnace hot zone and the gas flow out of these small holes is parallel with the sides of the muffle. This arrangement provides a curtain of gas flow above the centerline of the muffle and below the centerline of the muffle, providing uniform gas delivery to both the top and bottom surfaces of the material passing through the furnace.

The back side of the sparger pipes, opposite the holes, is welded to another "U" shaped pipe with no holes. This second pipe is used to cool the sparger pipe by flowing cold nitrogen gas through it. The gas flow can be adjusted to control the temperature of the sparger pipes. Both ends of the sparger pipes and both ends of the cooling pipes protrude through the top and bottom plates so they may be attached to the gas feed system outside the gas manifold. The plates also include a connection for inert gas.

The entrance end of the entrance gas manifold is connected to an air tight acrylic box. This box can be purged with nitrogen in order to make it inert. The box contains an axle on which a spool of fabric material can be held. The axle allows the material to unwind into the furnace while maintaining an inert atmosphere. The lid on the box can be easily removed so that the spool of material can be changed out. The lid cannot be removed while the furnace is in operation.

At the exit end of the muffle, a gas manifold identical to the entrance gas manifold is installed. This manifold does not have sparger pipes installed and is only used to introduce inert gas into the end of the muffle to shield the reactive area from the air. The exit gas manifold has slot plates at both ends to reduce the size of the opening into the furnace. This assures that the atmosphere inside will remain inert with a small amount of inert gas flow. This inert gas also serves to dilute the reactive gas so that it will be below the lower explosive limit before it exits the furnace.

All of the gases required for the process are kept in a gas storage rack near the furnace. Each gas is pressure regulated and then fed into a gas control panel. The gas control panel provides manual on/off control of all the gases, digital mass flow control of the process gases and manual volumetric flow control of the inert gas purge controls. There are three inert gas circuits on the system. The first is the box purge; this is used to purge the acrylic box of nitrogen prior to operating the furnace. The second is the inert gas being introduced into the entrance gas manifold. This gas serves to help dilute the reactive gas to the proper concentration. The third circuit is connected to the exit gas manifold. This circuit is used to keep air out of the muffle.

There are four digital mass flow controllers. Each controller can be set to control a different gas. The exits of the flow controllers are joined together and flow through a mixing tube so that the gas mixture will be uniform. The gas mixture flows through a single tube to the top of the entrance gas manifold. There the gas mixture flows into a heated glass vessel where it combines with a catalyst vapor and then flows into the sparger pipes with the catalyst vapor.

The liquid phase catalyst is pumped into the glass vessel using a digital peristaltic pump. This provides accurate metering of the catalyst liquid. The elevated temperature within the vessel causes the catalyst to evaporate and the vapor is carried into the furnace through the sparger pipes. All of the tubing between the heated vessel and the sparger pipes is wrapped with heat tape to maintain the temperature of the catalyst vapor. Without the heated tubes, the catalyst would condense on the walls of the tube and would not be carried into the furnace.

The heated vessel has a bottom heater and a side heater which can be controlled independently to obtain the proper temperature. There are three more separate heaters on the tubes between the vessel and the sparger pipes, each with their own controller. There are also four more heaters on the entrance gas manifold which maintain the temperature of the gas manifold to be sure that the catalyst vapor will not condense on the walls of the gas manifold. All of the nine temperature controllers are mounted in a control panel.

At the exit end of the exit gas manifold there is an acrylic box with an axle for mounting the rewind spool. This axle is driven by an AC motor controlled by a variable frequency drive. The drive adjusts the speed of the motor to control the linear speed of the material going through the furnace. An auxiliary encoder is placed on the material at the exit and is used as feedback so that the drive can automatically adjust the motor speed to keep the speed of the material constant.

The rewind axle is mounted so that it can be angled toward the front or back of the furnace. This motion is controlled with a closed loop linear actuator which, in combination with a laser sensor, can automatically adjust the tracking of the rewind spool so that the material winds onto the spool straight. The controller for this functionality is mounted in a panel with the controls for the AC motor controller.

All of the gas, temperature and motion controls are mounted in a common rack so that the entire control system is together. This allows the operator to monitor or control all of the process parameters from a single location. The rack is on casters so that it can be easily moved to allow for service or adjustment of any part of the furnace.

The invention is illustrated in more detail by the following non-limiting example.

EXAMPLE 1

A carbon fiber mat commercially available from Cytec Fiberite under the trade name T650-35 8-harness satin weave was exposed to an oxidizing gas of air at a temperature of 450° C. for 25 minutes to activate the surface of the carbon fibers. The activated mat was immersed in a solution of 28 g of aluminum isopropoxide in 1000 ml 2-propanol solvent at a temperature of 25° C. for 72 hours. The mat was allowed to drain and dried at a temperature of 25° C. to deposit aluminum receptors on the surface of the fibers. The mat was introduced continuously into a heated chamber at a temperature of 750° C. A ferrocene vapor at a concentration of 43 g/1 l. of xylene solvent was produced at 180° C. and introduced into the heated chamber of 750° C. at the flow rate of 2.25 ml/min. The fiber mat was directly exposed to the catalyst vapor to produce a mat having iron catalyst deposited on the aluminum receptors on the surface of the carbon fibers. The thus treated mat was subjected to chemical vapor deposition to grow carbon nanotubes by exposing the mat to acetylene gas at a concentration of 300 sccm (standard cubic centimeters per minute) and 4000 sccm of hydrogen and 10 l/min of nitrogen at temperature of 750° C. for 10 minutes. Analysis of the mat showed that the nanotubes have a diameter ranging from 10 to 20 nm and length of about 10-200 um.

Having described the invention in detail and by reference to preferred embodiments thereof, it will be apparent that modifications and variations are possible without departing from the scope of the invention as defined by the following claims.

What is claimed is:

1. A method of growing carbon nanomaterials on a substrate comprising:
   providing a substrate having a surface;
   exposing at least a portion of said surface of said substrate to an oxidizing gas;
   depositing a seed material to form a receptor for a catalyst on the surface of said substrate, the seed material being a metal compound applied to the oxidized surface and having receptor sites for the catalyst, wherein the seed material is deposited on the substrate by treating the substrate with a solution of the seed material;
   depositing a catalyst directly on the seed material by exposing the receptor on the surface of the substrate to a vapor of the catalyst; and
   subjecting the catalyst on the surface of the substrate to chemical vapor deposition in a carbon containing gas to cause growth of the carbon nanomaterial.

2. The method of claim 1 wherein said substrate is selected from carbon, graphite, metal, metal alloys, ceramic, glass, fiberglass, ceramic, and intermetallic compounds.

3. The method of claim 2 wherein said substrate is selected from the group consisting of metal, metal alloys, intermetallic compounds, or graphite.

4. The method of claim 3 wherein said substrate is selected from the group consisting of a carbon substrate selected from carbon fibers, carbon nanofibers, carbon films, carbon foam, carbon fabric, and carbon fiber bundles.

5. The method of claim 1 wherein said oxidizing gas is selected from ozone, carbon dioxide, air and mixtures thereof.

6. The method of claim 5 wherein said substrate is exposed to said oxidizing gas at a temperature of about 100° C. and 550° C.

7. The method of claim 6 wherein said oxidizing gas comprises ozone and said substrate is exposed to said gas at a temperature of between about 100 to 200° C.

8. The method of claim 6 wherein said oxidizing gas comprises air and said substrate is exposed to said gas at a temperature of between about 300 to 550° C.

9. The method of claim 1 wherein said chemical vapor deposition is at a temperature about 600 to 900° C.

10. The method of claim 1 wherein said chemical vapor deposition utilizes hydrocarbon gases selected from acetylene, ethylene, methane, or other carbon containing precursors and combinations thereof.

11. The method of claim 1 wherein the catalyst vapor is formed by introducing a catalyst solution comprising water or alcohol and soluble salts into a reactor at a temperature that causes the catalyst to vaporize.

12. The method of claim 1 wherein said soluble salts are selected from iron, nickel, cobalt, and combinations thereof.

13. A substrate including carbon nanomaterials on the surface thereof formed by the method of claim 1.

14. The substrate of claim 13 wherein said carbon nanomaterials have a thickness of from about 100 nm to about 30 micron.

15. The method of claim 1 wherein the seed material is aluminum, molybdenum, or tungsten sulfate, nitrate or oxide and mixtures thereof.

16. The method of claim 15 wherein the seed material is aluminum oxide.

17. The method of claim 14 wherein the substrate is carbon or graphite.

* * * * *